US012003060B2

(12) United States Patent
Imai et al.

(10) Patent No.: US 12,003,060 B2
(45) Date of Patent: Jun. 4, 2024

(54) CONNECTOR AND COVER UNIT HAVING SHIELD AND COVER

(71) Applicant: SUMITOMO WIRING SYSTEMS, LTD., Mie (JP)

(72) Inventors: Yasuo Imai, Mie (JP); Hiroyuki Oomori, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 188 days.

(21) Appl. No.: 17/698,680

(22) Filed: Mar. 18, 2022

(65) Prior Publication Data

US 2022/0311190 A1 Sep. 29, 2022

(30) Foreign Application Priority Data

Mar. 24, 2021 (JP) ................................ 2021-049384

(51) Int. Cl.
*H01R 13/6581* (2011.01)
*H01R 13/506* (2006.01)

(52) U.S. Cl.
CPC ....... *H01R 13/6581* (2013.01); *H01R 13/506* (2013.01)

(58) Field of Classification Search
None
See application file for complete search history.

(56) References Cited

U.S. PATENT DOCUMENTS 5,487,682 A 1/1996 Miller et al.
5,584,727 A 12/1996 Miller et al.
5,586,911 A 12/1996 Miller et al.
6,808,417 B2 * 10/2004 Yoshida ............ H01R 13/6473 439/585
8,430,675 B2 * 4/2013 Hardy ................. H01R 12/724 439/63
2015/0200506 A1 * 7/2015 Guo ...................... H01R 43/24 264/261

FOREIGN PATENT DOCUMENTS

JP H07-320816 A 12/1995
JP 2020-145083 A 9/2020

* cited by examiner

*Primary Examiner* — Oscar C Jimenez
(74) *Attorney, Agent, or Firm* — Venjuris P.C.

(57) ABSTRACT

A connector 10 includes a housing 11 made of synthetic resin, a terminal 12 made of metal to be accommodated into the housing 11, a shield member 14 made of metal to be arranged on an outer periphery of the housing 11, and a cover member 15 made of synthetic resin for covering the shield member 14. The cover member 15 includes shield member locking portions 42 for locking the shield member 14 with the shield member 14 restricted from being detached from the cover member 14.

5 Claims, 8 Drawing Sheets

CONNECTOR AND COVER UNIT HAVING SHIELD AND COVER

CROSS-REFERENCE TO RELATED APPLICATIONS

This application is based on and claims priority from Japanese Patent Application No. 2021-049384, filed on Mar. 24, 2021, with the Japan Patent Office, the disclosure of which is incorporated herein in its entirety by reference.

TECHNICAL FIELD

The present disclosure relates to a connector and a cover unit.

BACKGROUND

Japanese Patent Laid-open Publication No. 2020-145083 discloses a wiring harness. This wiring harness includes a first UTP cable and a male connector connected to an end part of the first UTP cable. A male terminal connected to the end part of the first UTP cable is arranged in the male connector. The male connector is formed with a fitting groove open downward. A shield member is inserted into the fitting groove. The shield member is fixed to the male connector, such as by press-fitting. In this configuration, since the outer surface of the shield member is exposed to outside, stains and fingerprints are easily attached thereto.

Japanese Patent Laid-open Publication No. H06-196224 discloses a shield-side electrical connector assembly. In this shield-side electrical connector assembly, an electrical terminal is arranged in an inner housing and the inner housing is shielded by an upper shield and a lower shield. Further, the outer peripheries of the upper and lower shields are covered by an upper cover and a lower cover fit to each other. According to this configuration, the attachment of stains and fingerprints to the outer surface of a shield member can be suppressed. Note that a connector of this type is also disclosed in Japanese Patent Laid-open Publication No. H07-320816.

SUMMARY

There are cases where it is desired not to mount a shield member and a cover member in a connector manufacturing stage and to mount the shield member and the cover member in a construction stage (e.g. stage where the connector is installed in a vehicle) if necessary. However, in the configurations of Japanese Patent Laid-open Publication Nos. H06-196224 and H07-320816, a mounting operation of the shield member and the cover member is cumbersome.

Accordingly, it is aimed to provide a technique capable of facilitating a mounting operation of a shield member and a cover member on a housing.

The present disclosure is directed to a connector with a housing made of synthetic resin, a terminal made of metal to be accommodated into the housing, a shield member made of metal to be arranged on an outer periphery of the housing, and a cover member made of synthetic resin for covering the shield member, the cover member including a shield member locking portion for locking the shield member with the shield member restricted from being detached from the cover member.

The present disclosure is also directed to a cover unit to be mounted on an outer periphery of a housing, the cover unit including a shield member to be arranged on the outer periphery of the housing and a cover member made of synthetic resin for covering the shield member, the cover member including a shield member locking portion for locking the shield member with the shield member restricted from being detached from the cover member.

According to the present disclosure, it is possible to facilitate a mounting operation of a shield member and a cover member on a housing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
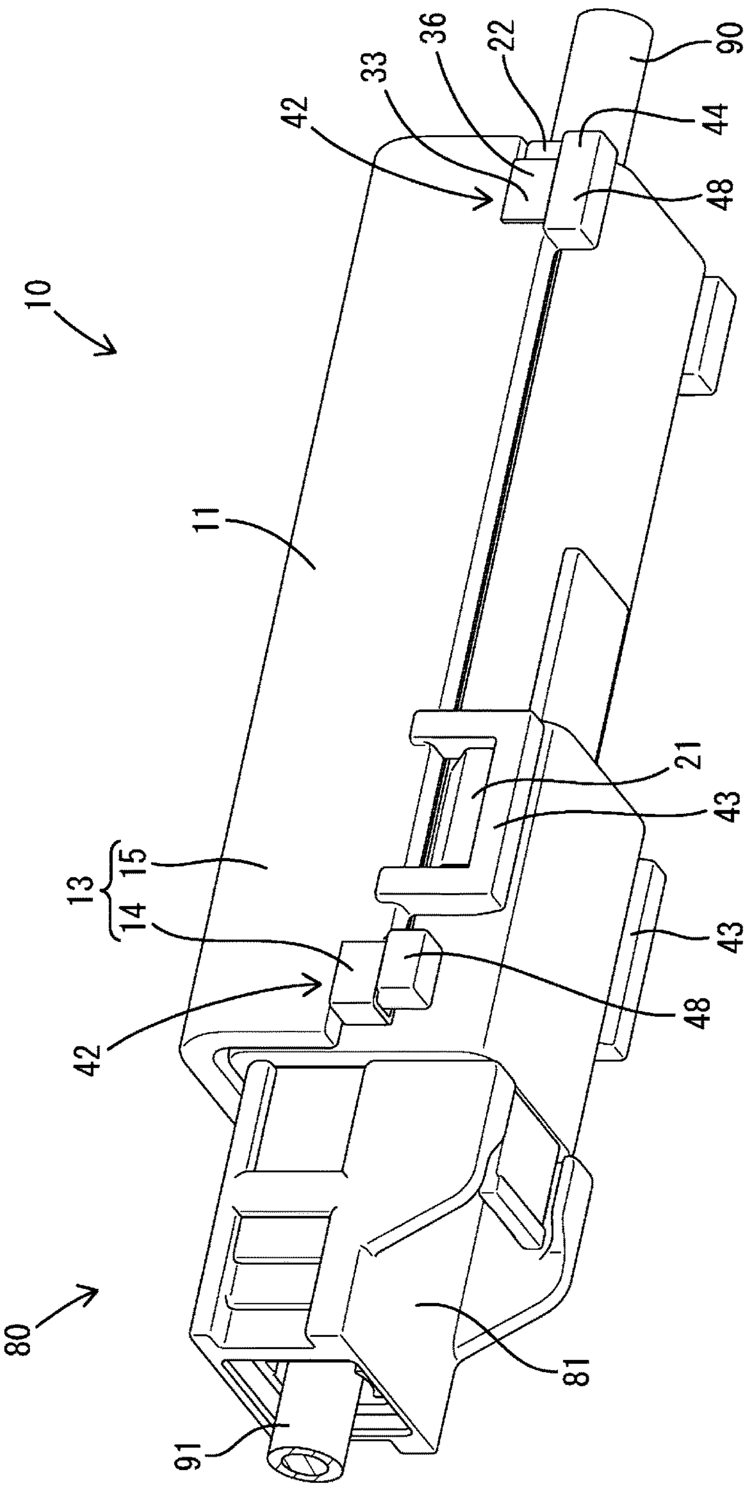
FIG. 1 is a perspective view showing a state where a connector of one embodiment is connected to a mating connector.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

(1) The connector of the present disclosure includes a housing made of synthetic resin, a terminal made of metal to be accommodated into the housing, a shield member made of metal to be arranged on an outer periphery of the housing, and a cover member made of synthetic resin for covering the shield member, the cover member including a shield member locking portion for locking the shield member with the shield member restricted from being detached from the cover member.

According to this configuration, the detachment of the shield member from the cover member can be restricted by the shield member locking portion of the cover member. Thus, the cover member and the shield member can be handled as one component, i.e. as a cover unit and a mounting operation on the housing is facilitated.

(2) Preferably, the cover member includes a housing locking portion for locking the housing with the housing restricted from being detached from the cover member.

According to this configuration, the cover unit can be coupled to the housing by locking the housing locking portion configured as a resin lock to the housing. Thus, the cover unit can be coupled to the housing while scratches on the housing are suppressed.

(3) Preferably, the housing locking portion of the cover member is resiliently deformable, and the housing includes a protrusion to be locked by the housing locking portion.

According to this configuration, the mounting operation on the housing can be facilitated while the complication of the shape of the housing is suppressed.

(4) Preferably, the cover member includes a pair of side plates provided at a distance in a width direction and a ceiling plate coupling the pair of side plates, the shield member includes stopping portions having a bent shape by being folded from an inner side to an outer side on both front and rear end parts of the pair of side plates, and the shield member locking portion of the cover member locks the stopping portions.

According to this configuration, the mounting operation on the housing can be facilitated while the complication of the shape of the shield member is suppressed.

(5) The cover unit of the present disclosure is a cover unit to be mounted on a housing, and includes a shield member and a cover member made of synthetic resin for covering the shield member, the cover member including a shield member locking portion for locking the shield member with the shield member restricted from being detached from the cover member.

According to this configuration, the detachment of the shield member from the cover member can be restricted by the shield member locking portion of the cover member. Thus, the cover member and the shield member can be handled as one component, i.e. as a cover unit and a mounting operation on the housing is facilitated.

DETAILS OF EMBODIMENT OF PRESENT DISCLOSURE

Specific examples of the present disclosure are described below with reference to the drawings. Note that the present invention is not limited to these illustrations and is intended to be represented by claims and include all changes in the scope of claims and in the meaning and scope of equivalents.

EMBODIMENT

A connector 10 of one embodiment is connected to a mating connector 80 as shown in FIG. 1. Note that, in the following description, sides of the connector 10 and the mating connector 80 facing each other when these connectors are connected are referred to as front sides. Further, a vertical direction shown in FIGS. 1 and 3 to 8 is directly referred to as a vertical direction. Further, a vertical direction in FIG. 2 is referred to as a width direction.

Figure 2:
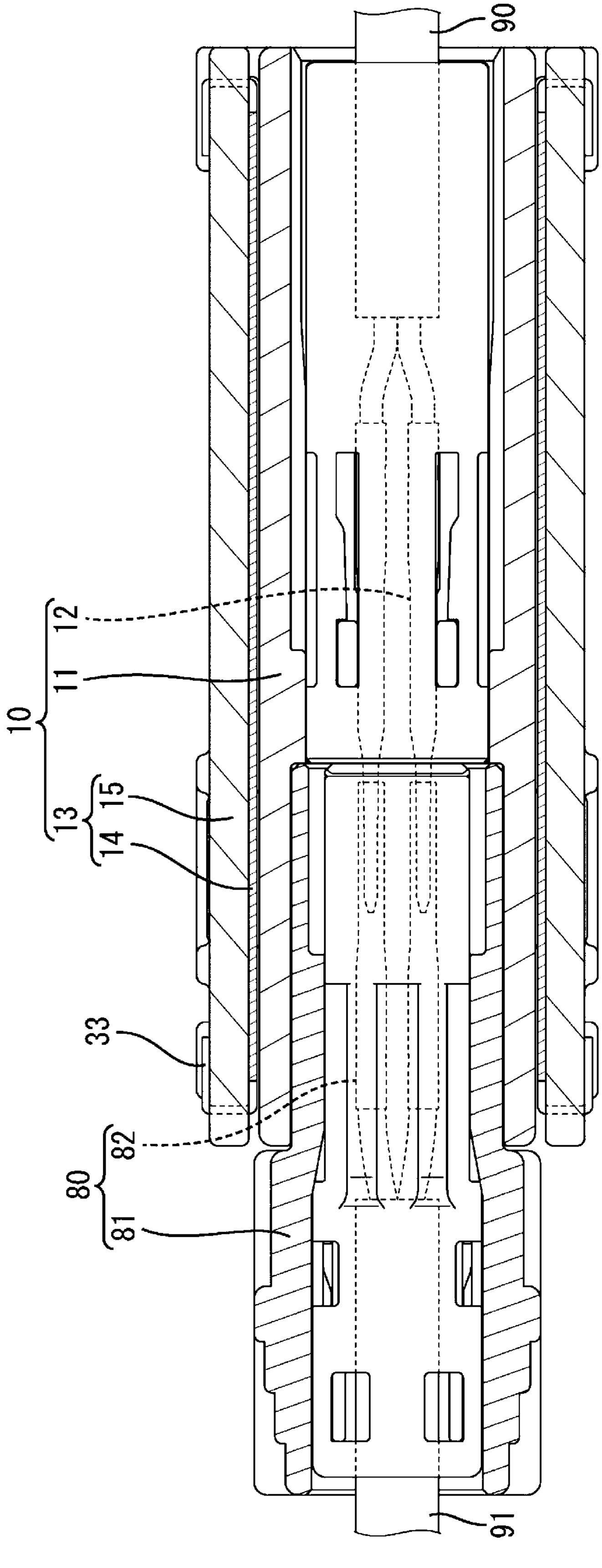
FIG. 2 is a plan view in section showing the state where the connector of the embodiment is connected to the mating connector.

The mating connector 80 to be connected to the connector 10 includes, as shown in FIG. 2, a mating housing 81, mating terminals 82 and a wire 91. The mating housing 81 is made of synthetic resin. The mating terminal 82 is made of metal and formed, for example, by bending a metal plate. The mating terminal 82 is a female terminal. The wire 91 is connected to rear end parts of the mating terminals 82. The wire 91 is an unshielded wire and is, for example, a UTP (Unshielded Twisted Pair) cable. The mating terminals 82 are arranged in the mating housing 81 while being restricted from coming out rearward.

As shown in FIG. 2, the connector 10 includes a housing 11, terminals 12 and a cover unit 13.

Figure 3:
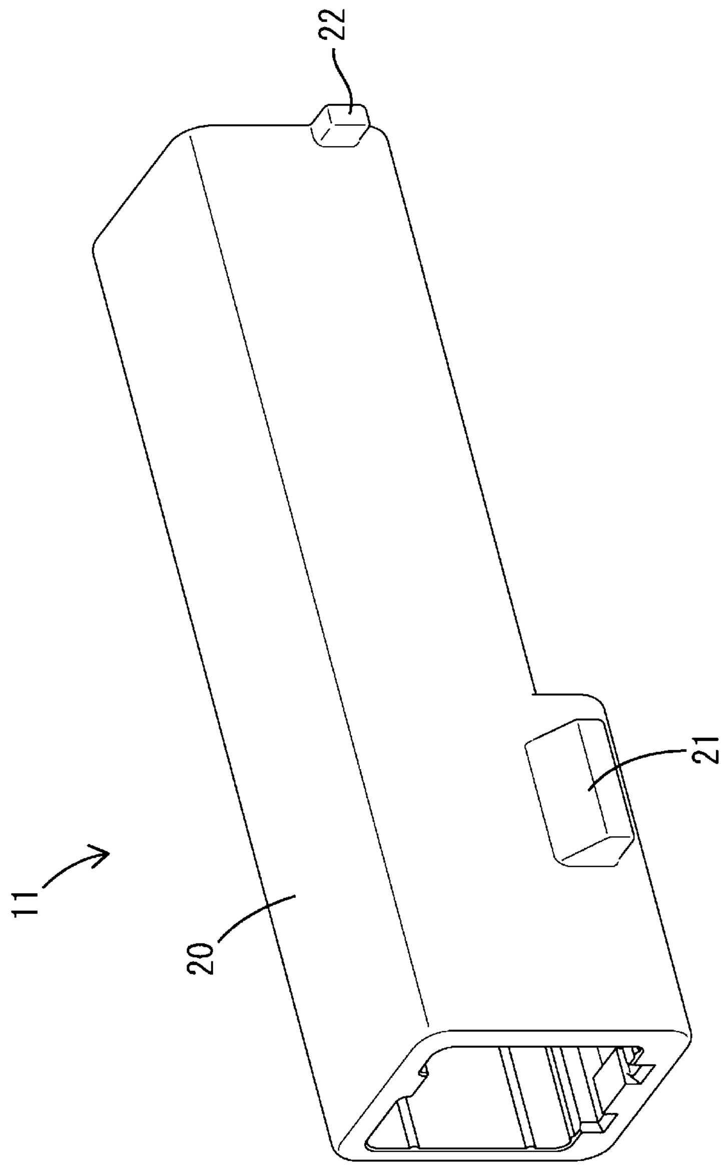
FIG. 3 is a perspective view of a housing.

The housing 11 is made of synthetic resin. As shown in FIG. 3, the housing 11 includes a housing body 20, first protrusions 21 and second protrusions 22.

As shown in FIG. 3, the housing body 20 is in the form of a tube, more specifically in the form of a rectangular tube extending along a front-rear direction. Both front and rear end surfaces of the housing body 20 are open.

The first and second protrusions 21, 22 are provided on both widthwise sides of the housing body 20 and project outward in the width direction (only one side is shown in FIG. 3). The first and second protrusions 21, 22 are arranged while being spaced apart in the front-rear direction. The first protrusions 21 are arranged on a front end side of the housing body 20, and the second protrusions 22 are arranged on a rear end side of the housing body 20. The lower surfaces of the first protrusions 21 are flat surfaces along the width direction and the front-rear direction. The upper surfaces of the first protrusions 21 are inclined downward toward a widthwise outer side. The upper and lower surfaces of the second protrusions 22 are flat surfaces along the width direction and the front-rear direction.

The terminal 12 is made of metal and formed, for example, by bending a metal plate. The terminal 12 is a male terminal as shown in FIG. 2. A wire 90 is connected to rear end parts of the terminals 12. The wire 90 is an unshielded wire and is, for example, a UTP (Unshielded Twisted Pair) cable. The terminals 12 are arranged in the housing 11 while being restricted from coming out rearward.

As shown in FIG. 2, the cover unit 13 includes a shield member 14 and a cover member 15.

Figure 4:
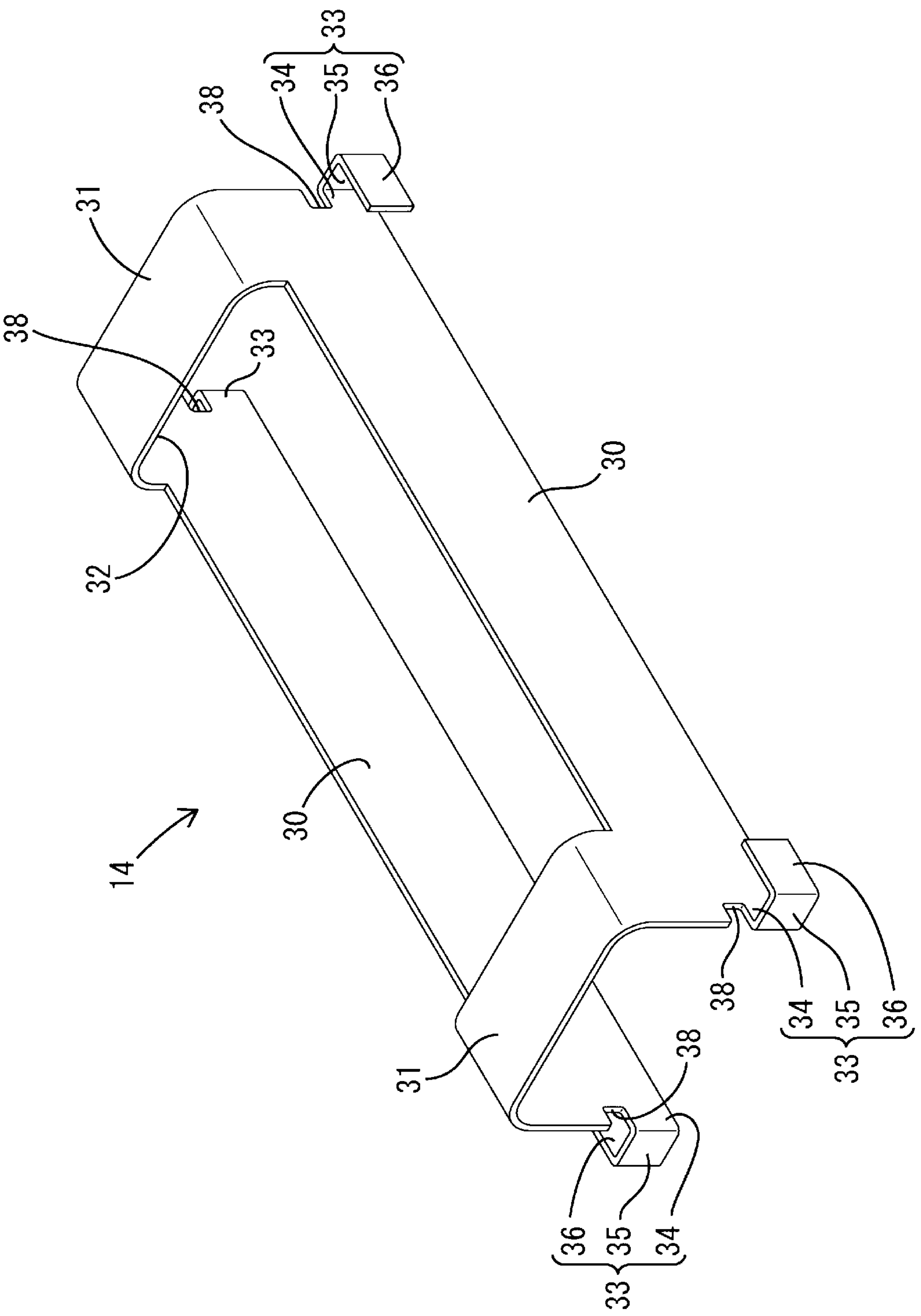
FIG. 4 is a perspective view of a shield member.

The shield member 14 is made of metal and formed, for example, by bending a metal plate. As shown in FIG. 4, the shield member 14 includes side portions 30, bridge portions 31, an opening 32 and stopping portions 33.

As shown in FIG. 4, the side portions 30 are paired and arranged at a distance in the width direction. The side portions 30 are plate-like and arranged with plate surfaces facing in the width direction. The bridge portions 31 couple upper end parts of the pair of side portions 30. The bridge portions 31 are paired and provided at a distance in the width direction. The opening 32 is formed by being surrounded by the pair of side portions 30 and the pair of bridge portions 31, and is open in the upper surface of the shield member 14. Note that the shielding performance of a shield member including an opening is illustrated in Japanese Patent Laid-open Publication No. 2020-145083.

The stopping portions 33 are parts to be locked to the cover member 15. As shown in FIG. 4, the stopping portion 33 includes an inner plate portion 34, a folded portion 35 and an outer plate portion 36. The inner plate portion 34, the folded portion 35 and the outer plate portion 36 are formed by being bent to contact a later-described shield member locking portion 42 of the cover member 15. The inner plate portions 34 are provided on both front and rear sides of lower end sides of the side portions 30. The inner plate portion 34 and the outer plate portion 36 are arranged to face each other in the width direction. The folded portion 35 connects outer end parts in the front-rear direction of the inner plate portion 34 and the outer plate portion 36.

As shown in FIG. 4, cut portions 38 are formed above the inner plate portions 34 by concavely cutting the side portions 30.

Figure 5:
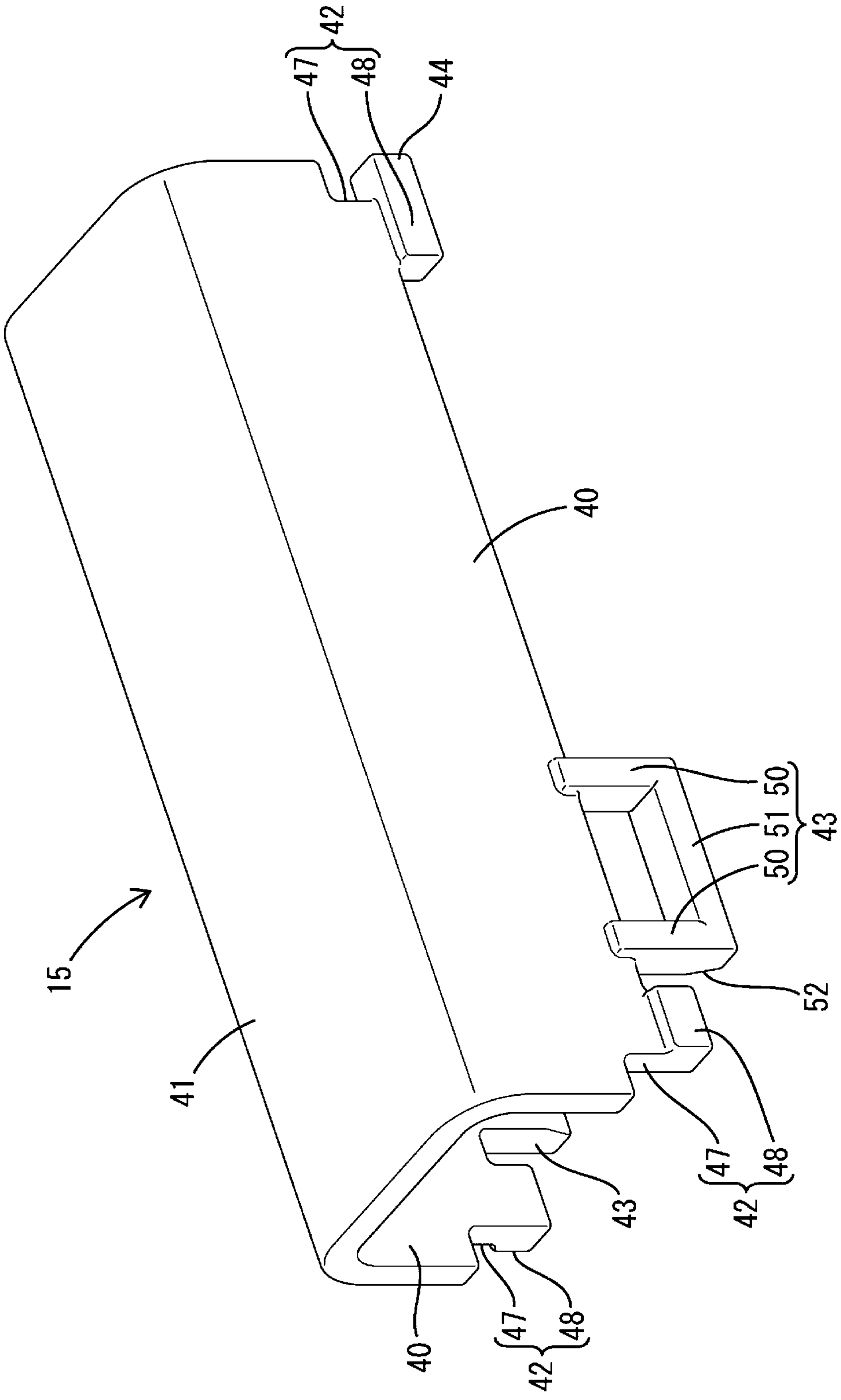
FIG. 5 is a perspective view of a cover member viewed obliquely from above.
Figure 6:
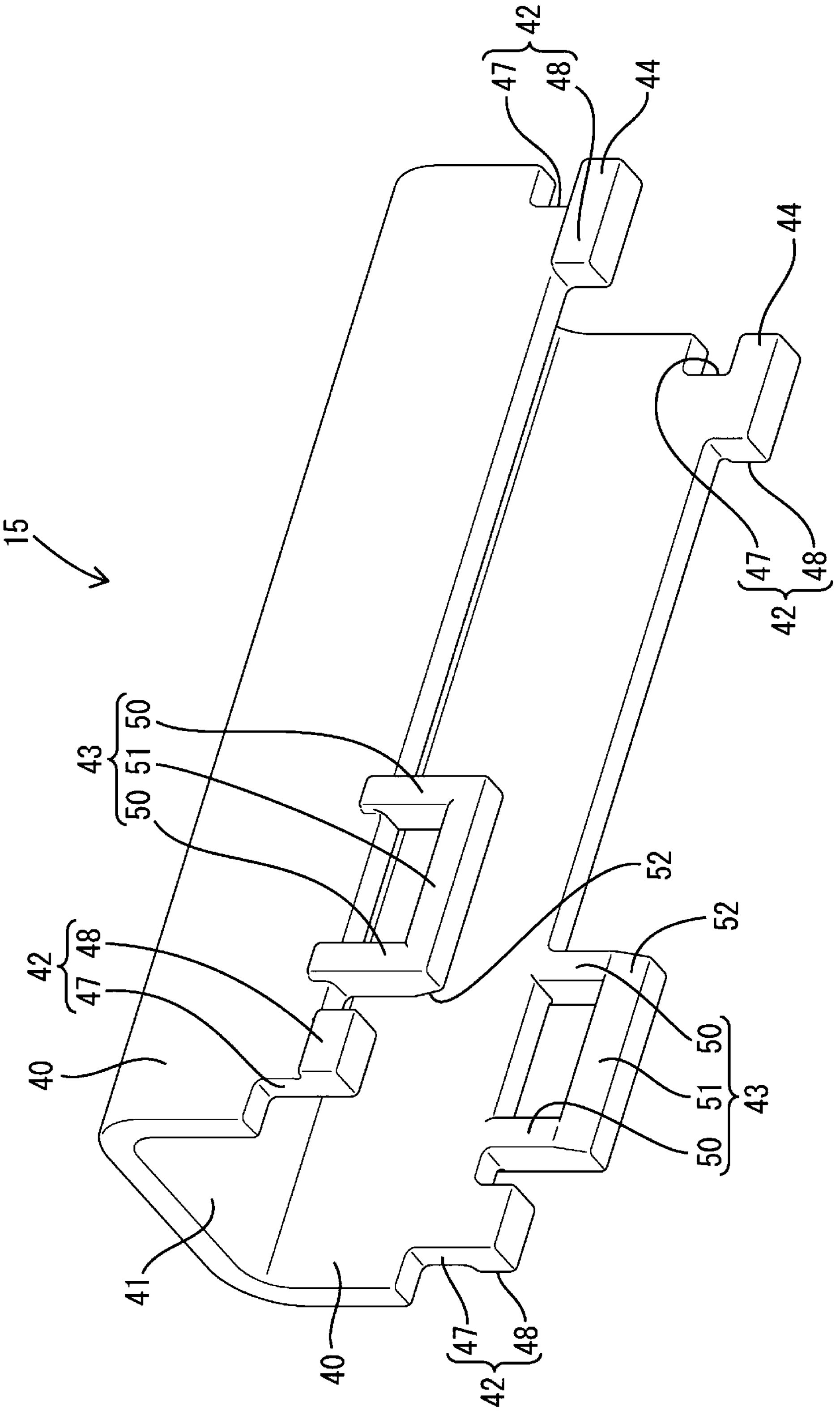
FIG. 6 is a perspective view of the cover member viewed obliquely from below.

The cover member 15 is made of synthetic resin. The cover member 15 is a member for covering the shield member 14. As shown in FIGS. 5 and 6, the cover member 15 includes side plates 40 and a ceiling plate 41. The side plates 40 are paired and arranged at a distance in the width direction. The side plates 40 are plate-like and arranged with plate surfaces facing in the width direction. The ceiling plate 41 connects upper end parts of the pair of side plates 40. The ceiling plate 41 is plate-like and arranged with plate surfaces facing in the vertical direction.

As shown in FIGS. 5 and 6, the cover member 15 includes the shield member locking portions 42, first housing locking portions 43 and second housing locking portions 44.

The shield member locking portions 42 are parts for locking the stopping portions 33 of the shield member 14. The shield member locking portions 42 are arranged on both front and rear end parts of lower end sides of the side plates 40 as shown in FIGS. 5 and 6. The shield member locking portion 42 includes a step portion 47 and a protruding portion 48. The step portions 47 are recessed inwardly in a stepped manner in the front-rear direction on both front and rear ends of the side plates 40. The step portion 47 is recessed downward in a stepped manner. The protruding portion 48 protrudes outward in the width direction from a lower side of the step portion 47.

The first housing locking portions 43 are parts for locking the first protrusions 21 of the housing 11. As shown in FIGS. 5 and 6, the first housing locking portion 43 includes arm portions 50 and a coupling portion 51. The arm portions 50 are paired, project downward from a lower end part of the side plate 40 and are arranged at a distance in the front-rear direction. The coupling portion 51 couples lower end parts of the pair of arm portions 50 to each other. The coupling portion 51 has a guiding surface 52 on a widthwise inner side surface. The guiding surface 52 is inclined inwardly in the width direction from the lower end of the coupling portion 51 toward an upper side.

The second housing locking portions 44 are parts for locking the second protrusions 22 of the housing 11. As shown in FIGS. 5 and 6, the second housing locking portion 44 projects rearward in a rear end part of the cover member 15. More specifically, the second housing locking portion 44 projects rearward from a lower side of the rear step portion 47, out of the front and rear step portions 47. The second housing locking portion 44 is integrated with the protruding portion 48 of the shield member locking portion 42.

Figure 7:
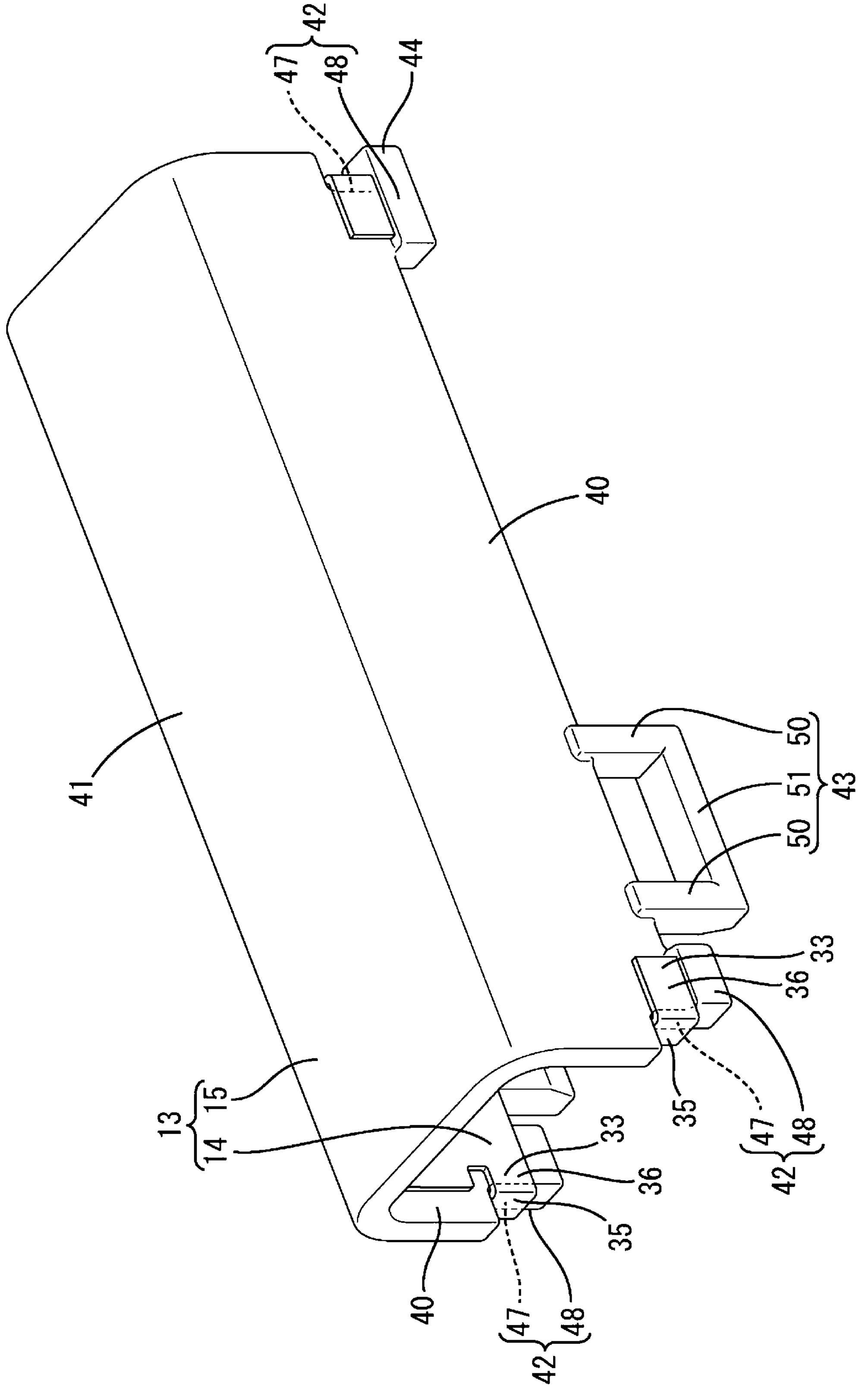
FIG. 7 is a perspective view of a cover unit.

As shown in FIG. 7, the shield member 14 is locked to the cover member 15. Specifically, the side portions 30 and the bridge portions 31 of the shield member 14 are arranged inside the cover member 15. Then, the stopping portions 33 are folded from inner sides toward outer sides of the step portions 47 to sandwich the step portions 47 in the width direction. At least either front or rear stopping portions 33 are bent after the other stopping portions 33 are mounted on the cover member 15. The inner plate portions 34 and the outer plate portions 36 of the stopping portions 33 are crimped to sandwich the side plates 40 of the cover member 15 in the width direction. The outer plate portions 36 of the stopping portions 33 are arranged above the protruding portions 48 and restricted from falling down by the protruding portions 48. In this way, the integrally handleable cover unit 13 is configured.

Figure 8:
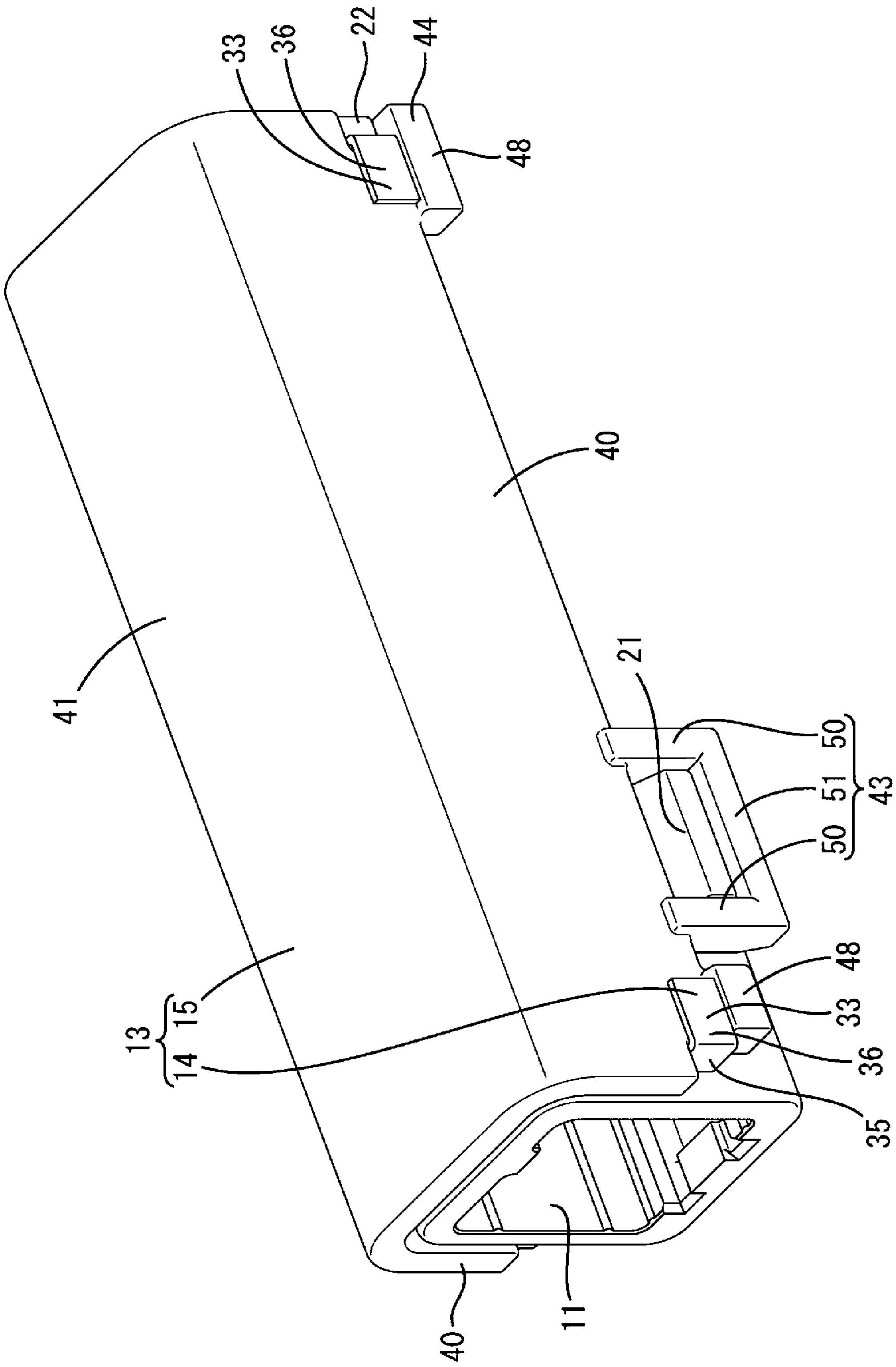
FIG. 8 is a perspective view of the connector including the cover unit.

The cover unit 13 is mounted by being put on the housing 11 from above. Specifically, the second protrusions 22 of the housing 11 are fit into the rear step portions 47 of the cover member 15, and the cover unit 13 is rotated about the second protrusions 22. Then, the first housing locking portions 43 of the cover member 15 are pushed and deflected outward in the width direction by the first protrusions 21 of the housing 11 and return to the initial shape by resilient forces thereof after riding over the first protrusions 21. In this way, as shown in FIG. 8, the first housing locking portions 43 lock the first protrusions 21 and the second housing locking portions 44 lock the second protrusions 22. Further, the outer plate portions 36 of the stopping portions 33 are sandwiched and held between the step portions 47 and the second protrusions 22. At the time of removal, the cover unit 13 can be removed by deflecting the first housing locking portions 43 outward in the width direction.

As shown in FIG. 2, the connector 10 is connected to the mating connector 80. With the connector 10 connected to the mating connector 80, the terminals 12 of the connector 10 and the mating terminals 82 of the mating connector 80 are connected.

As described above, the cover member 15 of the connector 10 includes the shield member locking portions 42 for locking the shield member 14 with the shield member 14 restricted from being detached from the cover member 15. Thus, the detachment of the shield member 14 from the cover member 15 can be restricted by the shield member locking portions 42 of the cover member 15. Therefore, the cover member 15 and the shield member 14 can be handled as one component, i.e. as the cover unit 13, and are easily mounted on the housing 11.

Further, since the cover unit 13 can be removably mounted on the housing 11, a worker can mount or remove the cover unit 13 if necessary at the time of construction (e.g. at the time of installation in a vehicle). For example, if another wire is adjacently arranged, the generation of noise due to the adjacent wire can be suppressed by mounting the cover unit 13. Conversely, if another wire is not adjacent, usage without mounting the cover unit 13 is possible.

Further, in the connector 10, the cover member 15 includes the first and second housing locking portions 43, 44 for locking the housing 11 with the housing 11 restricted from being detached from the cover member 15. Thus, in the connector 10, the cover unit 13 can be coupled to the housing 11 by respectively locking the first and second housing locking portions 43, 44 configured as resin locks to the first and second protrusions 21, 22 of the housing 11. Therefore, the cover unit 13 can be coupled to the housing 11 while scratches on the housing 11 are suppressed.

Further, the first and second housing locking portions 43, 44 of the cover member 15 are resiliently deformable. The housing 11 includes the first protrusions 21 to be locked by the first housing locking portions 43 and the second protrusions 22 to be locked by the second housing locking portions 44. Thus, in the connector 10, the mounting operation on the housing 11 can be facilitated while the complication of the shape of the housing 11 is suppressed.

Further, the cover member 15 includes the pair of side plates 40 provided at a distance in the width direction and the ceiling plate 41 coupling the pair of side plates 40. The shield member 14 includes the stopping portions 33 having a bent shape by being folded from the inner side to the outer side on both front and rear end parts of the pair of side plates 40. The shield member locking portions 42 of the cover member 15 lock the stopping portions 33. Thus, in the connector 10, the mounting operation on the housing 11 can be facilitated while the complication of the shape of the shield member 14 is suppressed.

Other Embodiment of Present Disclosure

The embodiment disclosed this time should be considered illustrative in all aspects, rather than restrictive.

(1) Although the cover member is locked to the housing in the above embodiment, the shield member may be locked to the housing.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

a housing made of synthetic resin;

a terminal made of metal to be accommodated into the housing;

a shield made of metal to be arranged on an outer periphery of the housing; and a cover made of synthetic resin for covering the shield and including a pair of side plates extending along a front to rear direction, each side plate including shield locking portions positioned at front and rear ends of each side plate for locking with the shield to restrict the shield from being detached from the cover, wherein the shield includes stopping portions having a bent shape by being folded from an inner side to an outer side of each side plate over the shield locking portions.

2. The connector of claim 1, wherein the cover includes a housing locking portion for locking the housing with the housing restricted from being detached from the cover.

3. The connector of claim 2, wherein:

the housing locking portion of the cover is resiliently deformable, and the housing includes a protrusion to be locked by the housing locking portion.

4. The connector of claim 1, wherein:

the cover includes a ceiling plate coupling the pair of side plates, and the shield locking portions of the cover lock the stopping portions.

5. A cover unit to be mounted on a housing, comprising:

a shield; and a cover made of synthetic resin for covering the shield and including a pair of side plates extending along a front to rear direction, each side plate including a shield locking portions positioned at front and rear ends of each side plate for locking with the shield to restrict the shield from being detached from the cover, wherein the shield includes stopping portions having a bent shape by being folded from an inner side to an outer side over the shield locking portions of each side plate of the cover.

* * * * *